(12) United States Patent
Onda et al.

(10) Patent No.: US 11,038,407 B2
(45) Date of Patent: Jun. 15, 2021

(54) TWISTING AND BENDING DEVICE

(71) Applicant: HONDA MOTOR CO., LTD., Tokyo (JP)

(72) Inventors: Hideaki Onda, Tochigi-ken (JP); Yasuyuki Kimura, Tochigi-ken (JP); Yosuke Honda, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 115 days.

(21) Appl. No.: 16/357,478

(22) Filed: Mar. 19, 2019

(65) Prior Publication Data

US 2019/0296621 A1 Sep. 26, 2019

(30) Foreign Application Priority Data

Mar. 22, 2018 (JP) .............................. JP2018-053729

(51) Int. Cl.
*H02K 15/085* (2006.01)
*H02K 15/04* (2006.01)
*H02K 15/00* (2006.01)

(52) U.S. Cl.
CPC ....... *H02K 15/085* (2013.01); *H02K 15/0087* (2013.01); *H02K 15/0414* (2013.01)

(58) Field of Classification Search
CPC ............. H02K 15/085; H02K 15/0414; H02K 15/0087; Y10T 29/49071; Y10T 29/49073; Y10T 29/49009; Y10T 29/53143; Y10T 29/53161
USPC ................. 29/605, 606, 596, 732, 736, 735; 310/179
See application file for complete search history.

(56) References Cited

U.S. PATENT DOCUMENTS

| 5,778,512 | A * | 7/1998 | Ichikawa | H02K 15/0414 |
| | | | | 29/598 |
| 6,177,747 | B1 * | 1/2001 | Maeda | H02K 3/12 |
| | | | | 310/179 |
| 6,249,956 | B1 * | 6/2001 | Maeda | H02K 15/0428 |
| | | | | 140/102.5 |
| 6,990,724 | B2 * | 1/2006 | Tamura | H02K 15/0056 |
| | | | | 29/596 |
| 10,673,310 | B2 * | 6/2020 | Yoshida | H02K 15/0428 |
| 2001/0007169 | A1 * | 7/2001 | Takahashi | H02K 15/0428 |
| | | | | 29/596 |
| 2003/0132679 | A1 * | 7/2003 | Kato | H02K 15/0037 |
| | | | | 310/179 |
| 2003/0233748 | A1 * | 12/2003 | Gorohata | H02K 3/505 |
| | | | | 29/596 |

(Continued)

FOREIGN PATENT DOCUMENTS

| JP | 2006-136082 | 5/2006 |
| JP | 2014-128129 | 7/2014 |
| WO | 2017-104685 | 6/2017 |

OTHER PUBLICATIONS

Chinese Office Action for Chinese Patent Application No. 201910223319.3 dated Sep. 18, 2020.

*Primary Examiner* — Peter Dungba Vo
*Assistant Examiner* — Kaying Kue
(74) *Attorney, Agent, or Firm* — Amin, Turocy & Watson, LLP

(57) ABSTRACT

A hollow portion is formed in a holding jig. A first projection protrudes from a first inner side wall of the hollow portion. As the holding jig rotates to twist and bend a leg portion of a conductor, the projection bites into the leg portion.

5 Claims, 5 Drawing Sheets

(56) References Cited

U.S. PATENT DOCUMENTS

| | | | |
|---|---|---|---|
| 2004/0074080 A1* | 4/2004 | Kato | H02K 15/0428 29/596 |
| 2004/0145257 A1* | 7/2004 | Oohashi | H02K 3/50 310/71 |
| 2006/0103255 A1* | 5/2006 | Seguchi | H02K 3/12 310/201 |
| 2010/0187938 A1* | 7/2010 | Yamamoto | H02K 3/12 310/195 |
| 2011/0012467 A1* | 1/2011 | Blissenbach | H02K 3/28 310/195 |
| 2015/0180319 A1* | 6/2015 | Kimura | H02K 15/0087 29/596 |
| 2018/0375409 A1 | 12/2018 | Yoshida et al. | |

* cited by examiner

TWISTING AND BENDING DEVICE

CROSS-REFERENCE TO RELATED APPLICATION

This application is based upon and claims the benefit of priority from Japanese Patent Application No. 2018-053729 filed on Mar. 22, 2018, the contents of which are incorporated herein by reference.

BACKGROUND OF THE INVENTION

Field of the Invention

The present invention relates to twisting and bending devices configured to twist and bend end parts of conductors fitted in slots formed in stator cores.

Description of the Related Art

Well-known stators include those provided with an annular stator core having a plurality of slots formed in the circumferential direction and segments for coils (hereinafter simply referred to as "segments") each fitted in two of the plurality of slots. Here, each segment includes a first leg portion, a second leg portion extending parallel to and opposing the first leg portion, and a curved turned portion connecting the first leg portion and the second leg portion, and thus has a substantially U shape. Since the plurality of slots are formed radially, for example, the first leg portions face the inner circumference side of the stator core, and the second leg portions face the outer circumference side.

The end parts of the first and second leg portions protrude from the slots. The protruding end parts are twisted and bent by a twisting and bending device described in, for example, Japanese Laid-Open Patent Publication No. 2014-128129 (in particular, see paragraph [0034] and FIG. 8). More specifically, the twisting and bending device includes holding jigs ("coil twisting jigs" in Japanese Laid-Open Patent Publication No. 2014-128129) into which the end parts of the leg portions are inserted, and twists the end parts of the leg portions by moving the holding jigs in the circumferential direction and in the axial direction relative to the stator core.

Subsequently, the twisted end parts are joined together using an appropriate technique such as TIG welding. The welded part forms electrical paths between the segments.

SUMMARY OF THE INVENTION

In such a twisting and bending device, the end parts of the leg portions often fall off the holding jigs during twisting and bending. In this case, twisting and bending cannot be completed. Moreover, even when the leg portions do not fall off, the leg portions may not be sufficiently bent (bending accuracy may be insufficient).

A principal object of the present invention is to provide a twisting and bending device capable of avoiding separation of a leg portion of a conductor from a holding member during twisting and bending.

Another object of the present invention is to provide a twisting and bending device capable of avoiding insufficient bending of the leg portion of the conductor.

According to an embodiment of the present invention, a twisting and bending device configured to twist and bend an end part of a conductor protruding from a slot of a stator core comprises a holding jig provided with a hollow portion into which the end part of the conductor is inserted and driving unit configured to move the holding jig in a circumferential direction and in an axial direction relative to the stator core, wherein at least one projection configured to bite into the conductor is formed on an inner side wall of the hollow portion, the end part of the conductor coming into contact with the inner side wall.

As described above, in the present invention, the projection is formed on the inner side wall of the hollow portion into which the conductor is inserted to bite into (be buried in) the conductor when the conductor is twisted and bent. The projection supports the conductor by penetrating and thus prevents displacement of the conductor inside the hollow portion. As a result, separation of the conductor from the hollow portion is avoided, and the conductor can be completely twisted and bent.

When the leg portion is completely twisted and bent at a proper position inside the hollow portion, the amount of bending is sufficiently large. That is, insufficient bending of the conductor can also be avoided.

The hollow portion includes, for example, a first inner side wall located on a side of a rotating direction in which the twisting and bending device (30) is rotated by the driving unit along the circumferential direction relative to the stator core and a second inner side wall opposing the first inner side wall. In this configuration, the projection is preferably formed on the first inner side wall. This is because the projection formed on the first inner side wall bites into the conductor as the leg portion moving in the circumferential direction inside the hollow portion is inclined toward the first inner side wall. This prevents displacement of the conductor.

A second projection may be formed on the second inner side wall. When the conductor is twisted and bent, a part of the conductor facing the second inner side wall approaches the second inner side wall. At this moment, the second projection bites into the conductor and further prevents the conductor from being displaced. Thus, separation of the conductor from the hollow portion and insufficient bending are avoided more effectively.

The second projection may be formed at a position corresponding to a bending starting position of the conductor on the second inner side wall of the hollow portion. The second projection formed at the position can easily bite into the conductor during the twisting and bending of the conductor. Typically, the position corresponding to the bending starting point of the conductor on the second inner side wall of the hollow portion is in the vicinity of the opening of the hollow portion.

An inclined portion that widens toward an opening of the hollow portion is preferably formed in the first inner side wall that is an inner side wall located on the rotating direction side. In this case, even when the conductor is slightly displaced when the conductor is inserted into the hollow portion, the conductor and the hollow portion can be approximately positioned with ease since the inclined portion widens the opening of the hollow portion. In addition, the conductor coming into contact with the inclined portion enters the hollow portion while being guided by the inclined portion. For the above-described reasons, the conductor can be easily inserted into the hollow portion.

According to the present invention, the projection formed on the inner side wall of the hollow portion into which the conductor is inserted bites into (is buried in) the conductor when the conductor is twisted and bent, and thus firmly supports the conductor. This prevents the conductor from being displaced inside the hollow portion, and thus separation of the conductor from the hollow portion is avoided.

Consequently, the conductor can be completely twisted and bent. The amount of bending of the leg portion can be made sufficiently large by completely twisting and bending the conductor at the proper position inside the hollow portion. That is, insufficient bending of the conductor is avoided.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED
EMBODIMENTS

A preferred embodiment of a twisting and bending device according to the present invention will be described in detail below with reference to the accompanying drawings.

Figure 1:
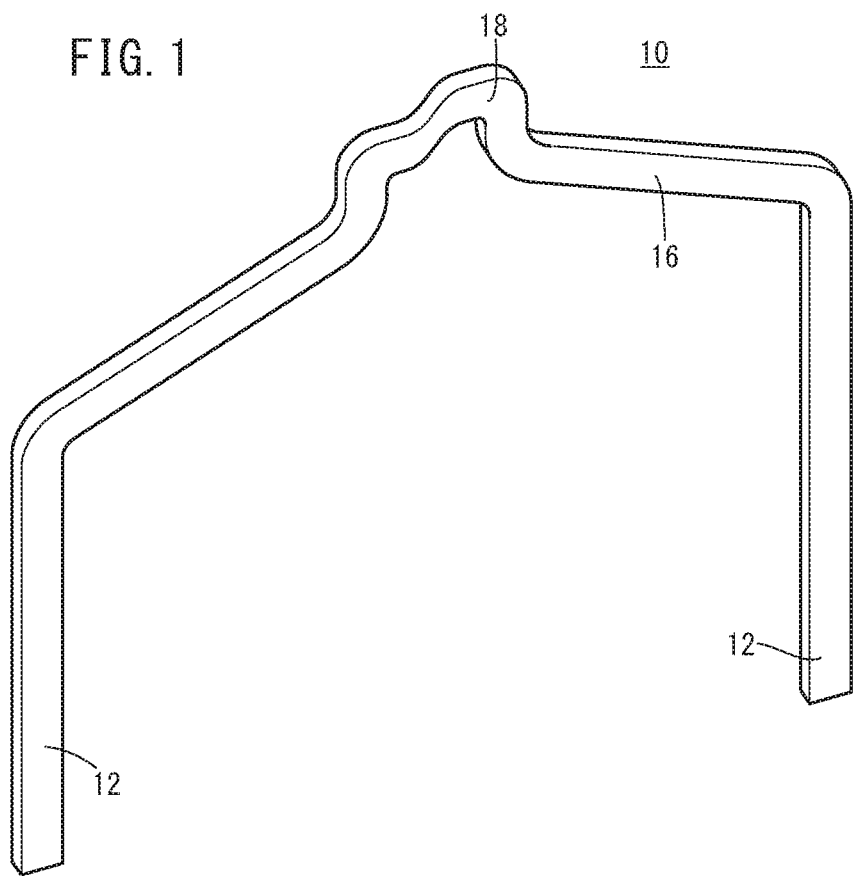
FIG. 1 is a schematic overall perspective view of a segment (conductor) for a coil to be used as an electromagnetic coil of a stator.

First, a stator will be described. FIG. 1 is a schematic overall perspective view illustrating a segment 10 for a coil (hereinafter also simply referred to as "segment") which is a conductor to be fitted in a stator core 20 (see FIG. 2). The segment 10 includes two leg portions 12 extending parallel to each other and a turned portion 16 lying between the leg portions 12. The turned portion 16 curves from the first leg portion 12 to the second leg portion 12, and thus the segment 10 has a substantially U shape.

The turned portion 16 includes a winding crank part 18. The crank part 18 causes displacement of the segment 10 in the radial direction of the stator core 20 (see FIG. 2).

Figure 2:
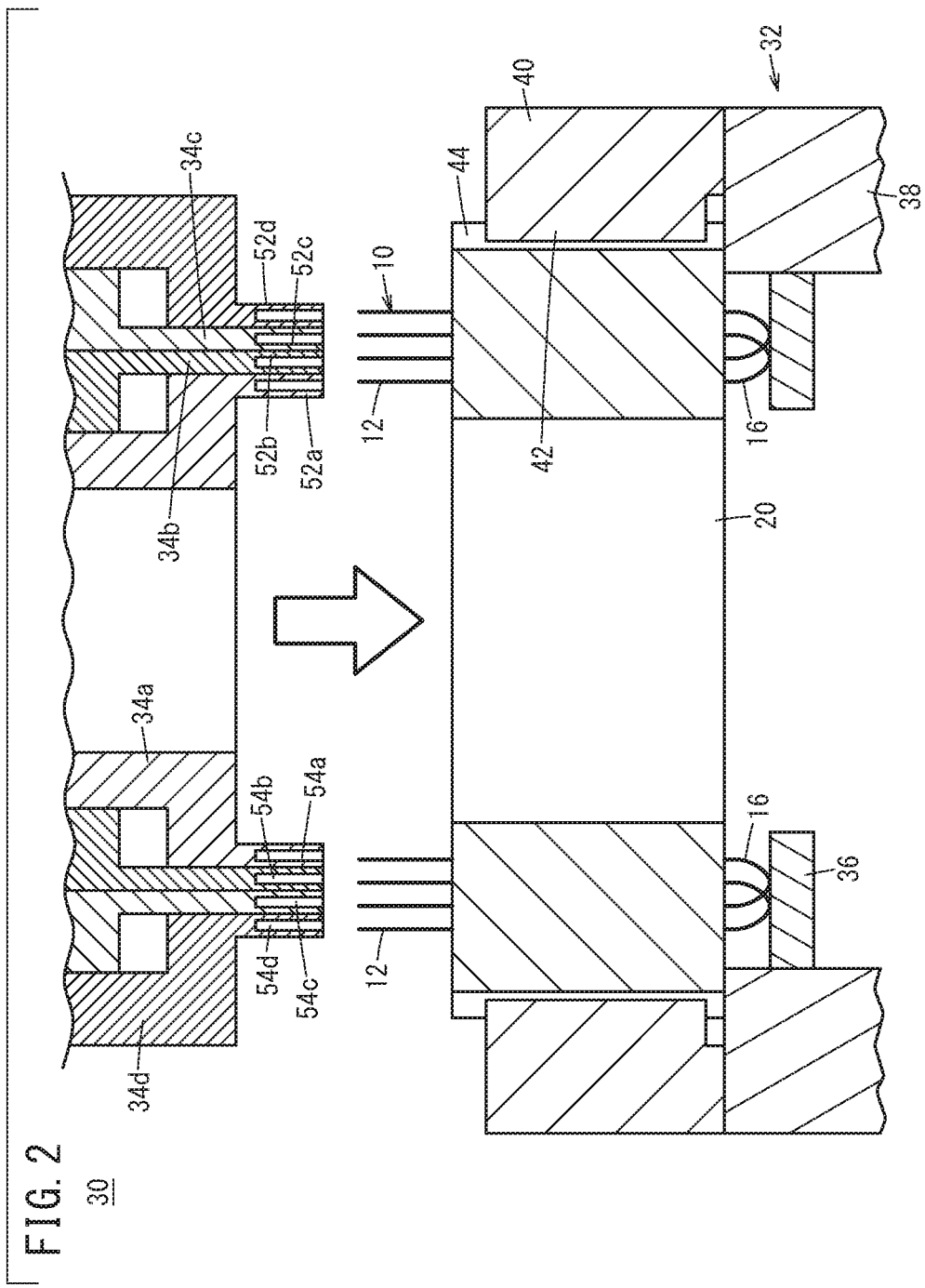
FIG. 2 is a longitudinal sectional view of a principal part of a twisting and bending device configured to twist and bend leg portions of the segments for the coils.

The first leg portion 12 of the segment 10 having the above-described shape is inserted into one of a plurality of slots (not illustrated) formed in the stator core 20 illustrated in FIG. 2, and the second leg portion 12 is inserted into another slot. As a result, the segment 10 serves as an electrical path between the two slots.

After a plurality of segments 10 are inserted into the slots, the plurality of leg portions 12 are joined together to form coils composed of the plurality of segments 10. This yields a stator. Note that the plurality of leg portions 12 are arranged in a line along the radial direction of the stator core 20 in each slot. In this embodiment, eight leg portions 12 are arranged as first to eighth layers from the inner circumference side to the outer circumference side in one slot.

The leg portions 12 of the segments 10 are twisted while being fitted in the slots. Next, a twisting and bending device 30 (see FIG. 2) configured to twist and bend the leg portions 12 will be described.

International Publication No. WO 2017/104685, for example, gives a detailed configuration of the twisting and bending device 30. Thus, only a brief explanation of a principal part will be given here.

The twisting and bending device 30 includes a lifting platform 32 configured to move the stator core 20 up and down and a first spindle 34a to a fourth spindle 34d which are holding jigs or twisting and bending jigs for holding the leg portions 12 fitted in the slots of the stator core 20 and twisting the leg portions 12.

The lifting platform 32 includes a substantially ring-shaped carrying disk 36 and a holding member 38 configured to hold the stator core 20. The holding member 38 supports the carrying disk 36 and a base 40.

The turned portion 16 of each segment 10 comes into contact with the upper end surface of the carrying disk 36. More specifically, each segment 10 is in an inverted position with the turned portion 16 facing downward and the leg portions 12 facing upward. In this state, the leg portions 12 are fitted in the slots.

The holding member 38 is disposed under the base 40. A protrusion 42 is formed on and protrudes radially inward from the inner circumferential wall of the base 40. The protrusion 42 is inserted into a recess 44 formed in the outer circumferential wall of the stator core 20. As a result, the rotation of the stator core 20 is stopped.

The first spindle 34a to the fourth spindle 34d have substantially cylindrical shapes and are concentrically disposed from the inside to the outside. Each of the first spindle 34a to the fourth spindle 34d includes a flange portion (not illustrated) and a tooth portion formed in the circumferential sidewall of each flange portion. Each tooth portion is coupled with a rotating shaft of a motor via a gear. The first spindle 34a to the fourth spindle 34d rotate separately as the respective motors are energized. Note that a bearing lies between two adjacent spindles.

In addition, the first spindle 34a to the fourth spindle 34d can rise and fall separately using, for example, fluid pressure such as air pressure. More specifically, the first spindle 34a to the fourth spindle 34d can move relative to the axial direction of the stator core 20 and the segments 10. Note that a cam follower and the like lie between two adjacent spindles among the first spindle 34a to the fourth spindle 34d.

As described above, the first spindle 34a to the fourth spindle 34d move relative to the stator core 20 in the circumferential direction and in the axial direction using driving unit such as motors and air pressure.

The first spindle 34a to the fourth spindle 34d grasp the leg portions 12 protruding from the slots. More specifically, first, first receiving portions 52a having an elongated shape along the axial direction of the leg portions 12 protrude from the innermost first spindle 34a. A first hollow portion 54a is formed in the corresponding first receiving portion 52a.

Figure 3:
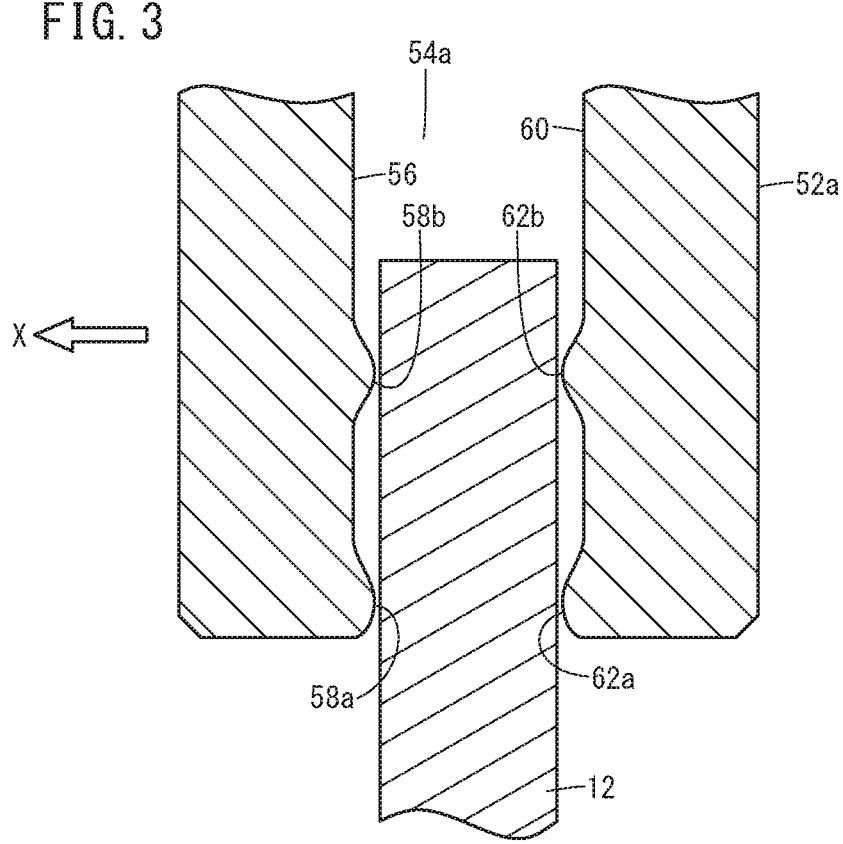
FIG. 3 is a schematic longitudinal sectional view of a first hollow portion formed in a first spindle (holding jig) constituting the twisting and bending device.

As illustrated in FIG. 3, which is an enlarged cross-sectional view of one of the first receiving portions 52a, two first projections 58a and 58b are formed on a first inner side wall 56 of the first hollow portion 54a, and two second projections 62a and 62b are formed on a second inner side wall 60. The first inner side wall 56 is an inner side wall located in the rotating direction side which is the direction of an arrow X illustrated in FIG. 3, and the second inner side wall 60 opposes the first inner side wall 56.

The first projection 58a protrudes from the vicinity of the opening of the first hollow portion 54a toward the second inner side wall 60. In addition, the first projection 58b protrudes from a position slightly below the end surface of the leg portion 12 toward the second inner side wall 60 inside the first hollow portion 54a. The second projections 62a and 62b respectively protrude toward the first projections 58a and 58b at positions opposing the first projections 58a and 58b.

In addition, the second spindle 34b is provided with second receiving portions 52b each having a second hollow portion 54b. Similarly, the third spindle 34c is provided with third receiving portions 52c each having a third hollow portion 54c, and the fourth spindle 34d is provided with fourth receiving portions 52d each having a fourth hollow portion 54d (see FIG. 2). As in the first hollow portions 54a, the first projections 58a and 58b and the second projections 62a and 62b are formed inside the second hollow portions 54b to the fourth hollow portions 54d.

Next, operational effects of the twisting and bending device 30 will be described.

To produce a stator, first, the two leg portions 12 of each segment 10 are inserted individually into two separate slots among the plurality of slots formed in the stator core 20. This step is repeated until a predetermined number of segments 10 are inserted into the slots. As a matter of course, the plurality of segments 10 may be inserted into the slots at once.

Next, the stator core 20 is placed on the carrying disk 36 to be in an inverted posture with the turned portions 16 facing downward and the leg portions 12 facing upward. At this moment, the protrusion 42 of the base 40 is inserted into the recess 44 of the stator core 20 and the turned portions 16 come into contact with the upper end surface of the carrying disk 36. This results in a state illustrated in FIG. 2 where the stator core 20 is prevented from rotating and secured at a predetermined position.

Next, the first spindle 34a to the fourth spindle 34d start to be lowered. After this, the first spindle 34a to the fourth spindle 34d are kept being lowered at a predetermined speed while at least one of the spindles rotates.

As a result that the stator core 20 is raised relative to the first spindle 34a to the fourth spindle 34d, the first leg portions 12 of the plurality of segments 10 each enter the first hollow portions 54a to the fourth hollow portions 54d. Among the leg portions protruding from the slots, the leg portions 12 located in the fifth layer, which is the innermost layer in the current process, are inserted into the first hollow portions 54a, and the leg portions 12 protruding from the sixth layer from the inner circumference side are inserted into the second hollow portions 54b. Similarly, the leg portions 12 protruding from the seventh and eighth layers from the inner circumference side are respectively inserted into the third hollow portions 54c and the fourth hollow portions 54d. The remaining (second) leg portion of each segment 10 is inserted into a hollow portion of a receiving jig (not illustrated).

In this state, the four motors are energized to rotate the first spindle 34a to the fourth spindle 34d. The rotating direction of the first spindle 34a and the third spindle 34c is set to be, for example, opposite to the rotating direction of the second spindle 34b and the fourth spindle 34d. More specifically, in a case where the first spindle 34a and the third spindle 34c rotate clockwise, the second spindle 34b and the fourth spindle 34d rotate counterclockwise. This causes the leg portions 12 fitted in the innermost fifth layer (first hollow portions 54a) and the seventh layer from the innermost layer (third hollow portions 54c) and the leg portions 12 fitted in the sixth layer from the innermost layer (second hollow portions 54b) and the eighth layer from the innermost layer (fourth hollow portions 54d) to be twisted in opposite directions.

As described above, the stator core 20 is kept gradually raised relative to the first spindle 34a to the fourth spindle 34d. Consequently, the leg portions 12 are obliquely twisted due to the rise and rotation.

Figure 4:
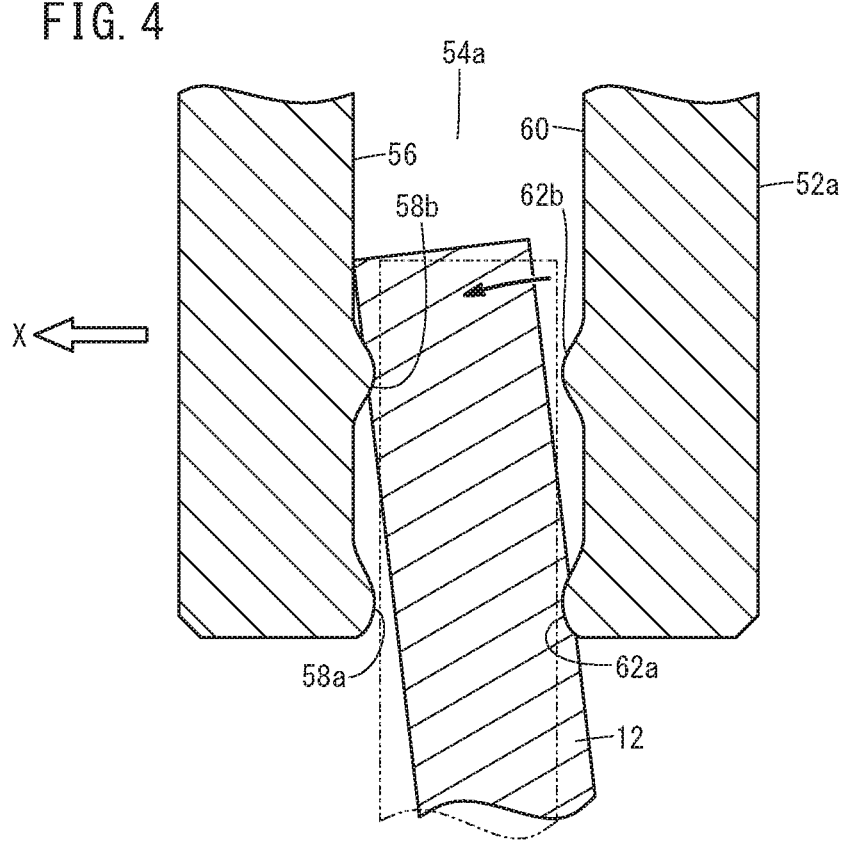
FIG. 4 is a schematic longitudinal sectional view illustrating a state where one of two first projections and one of two second projections formed on the inner side wall of the first hollow portion are penetrating into the leg portion.

At this time, during the twisting and bending, the end of the leg portion 12 fitted in each first hollow portion 54a moves in such a manner as to be pulled in a direction opposite to the rotating direction as illustrated in FIG. 4 and is slightly inclined. Here, the first projections 58a and 58b are formed on the first inner side wall 56 of the first hollow portion 54a, and the second projections 62a and 62b are formed on the second inner side wall 60 of the first hollow portion 54a. The end of the leg portion 12 is inclined to approach the first inner side wall 56 and to be away from the second inner side wall 60. Thus, the first projection 58b presses the leg portion 12 on the vicinity of the end surface, and the second projection 62a presses the leg portion 12 on the vicinity of the opening of the first hollow portion 54a.

As a result of pressing the leg portion 12, the first projection 58b and the second projection 62a are buried into the leg portion 12. More specifically, the first projection 58b and the second projection 62a bite into the leg portion 12. The penetration causes the first projection 58b and the second projection 62a to function as wedges. Thus, displacement of the leg portion 12 is avoided, and the leg portion 12 is prevented from falling off the first hollow portion 54a. This enables the leg portion 12 to be completely twisted and bent.

In addition, since displacement of the leg portion 12 is avoided, it is also avoided that an amount of bending is insufficient.

Here, the leg portion 12 is bent at the second projection 62a serving as a starting point. More specifically, the second projection 62a is formed on the second inner side wall 60 at a position corresponding to the bending starting point of the leg portion 12. Typically, the second projection 62a is formed in the vicinity of the opening of the first hollow portion 54a as described above.

Similarly, the first projection 58b and the second projection 62a bite into the end of the leg portion 12 fitted in each third hollow portion 54c and function as wedges. Thus, separation of the leg portion 12 from the third hollow portion 54c is avoided. On the other hand, the second spindle 34b and the fourth spindle 34d rotate in the direction opposite to the direction the first spindle 34a and the third spindle 34c rotate. Thus, in each of the second hollow portions 54b and the fourth hollow portions 54d, the leg portion 12 is inclined in a direction opposite to the direction illustrated in FIG. 4, and the first projection 58a and the second projection 62b bite into the leg portion 12.

In a case where the first spindle 34a to the fourth spindle 34d rotate in the directions opposite to the directions described above, the leg portions 12 fitted in the first hollow portions 54a to the fourth hollow portions 54d are inclined in the directions opposite to the directions described above. Thus, the first projections 58a and the second projections 62b bite into the leg portions 12 in the first hollow portions 54a and the third hollow portions 54c, and the first projection 58b and the second projection 62a bite into the leg portions 12 in the second hollow portions 54b and the fourth hollow portions 54d. Due to the biting, separation of the leg portions 12 from the first hollow portions 54a to the fourth hollow portions 54d is avoided in the same manner as described above.

In this manner, forming the first projections 58a and 58b and the second projections 62a and 62b on the respective inner side walls of the first hollow portions 54a to the fourth hollow portions 54d prevents the leg portions 12 from positionally deviating inside the first hollow portions 54a to the fourth hollow portions 54d of the first spindle 34a to the fourth spindle 34d, respectively, serving as the holding jigs. As described above, this is because one of the first projections 58a and 58b and one of the second projections 62a and 62b bite into the leg portions.

As a result, the leg portions 12 are prevented from falling off the first hollow portions 54a to the fourth hollow portions 54d. Consequently, the leg portions 12 are sufficiently twisted and bent. That is, insufficient bending is avoided, and the twisting and bending can be completed.

The first spindle 34a to the fourth spindle 34d are simultaneously raised as required to finish the twisting and bending of the leg portions 12.

As the first spindle 34a to the fourth spindle 34d are raised, the stator core 20 is relatively lowered together with the base 40, and the leg portions 12 are exposed. Next, the leg portions 12 in the first to fourth layers are twisted, bent, and exposed in the same manner as described above. Furthermore, the exposed leg portions 12 are joined together to form electrical paths between the segments 10. This yields a stator where the connected segments 10 work as electromagnetic coils.

As is clear from the above, the projections on the inner side walls located in the rotating direction and in the vicinities of the openings of the hollow portions (for example, the first projections 58a in the first hollow portion 54a and the third hollow portion 54c and the second projections 62a in the second hollow portion 54b and the fourth hollow portion 54d) do not particularly contribute to prevention of the displacement of the leg portions 12. Consequently, in a case where the rotating direction is set to only one direction, the above-described projections may be omitted.

Figure 5:
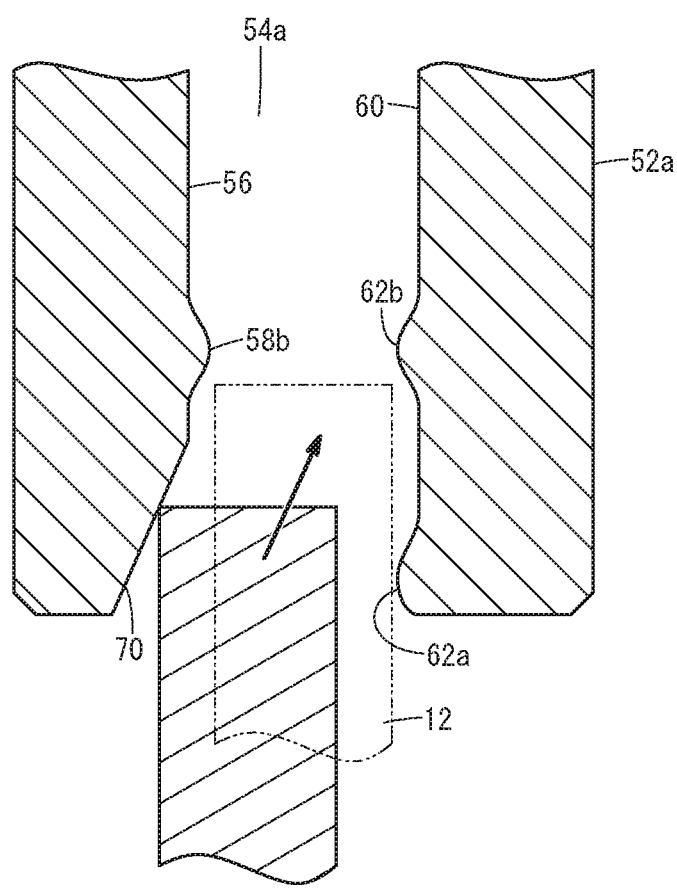
FIG. 5 is a schematic longitudinal sectional view of a principal part of the first spindle (holding jig) having an inclined portion in the vicinity of the opening of the first hollow portion.

Alternatively, inclined portions may be formed on the inner side walls located in the rotating direction, widening toward the openings. More specifically, as in the case of the first spindle 34a illustrated in FIG. 5, an inclined portion 70 is formed on the first inner side wall 56 in each first hollow portion 54a. In this case, even when the leg portion 12 is displaced with respect to the first hollow portion 54a, the leg portion 12 can be easily guided into the first hollow portion 54a due to the wide opening. In addition, in this case, a part of the displaced leg portion 12 in the vicinity of the end surface comes into contact with the inclined portion 70. Subsequently, the leg portion 12 is guided by the inclined portion 70 and enters the first hollow portion 54a.

That is, in this case, the inclined portion 70 functions as a guiding portion configured to guide the leg portion 12. Thus, the leg portion 12 is easily inserted into the first hollow portion 54a. In addition, when the leg portion 12 is twisted and bent, the first projection 58b and the second projection 62a bite into the leg portion 12 in the same manner as described above. Thus, displacement of the leg portion 12 is avoided.

The present invention is not limited to the above-described embodiment, and various modifications and equivalents can be made without departing from the spirit and scope of the present invention.

For example, all the rotating directions of the first spindle 34a to the fourth spindle 34d may be the same.

What is claimed is:

1. A twisting and bending device that twists and bends an end part of a conductor protruding from a slot of a stator core, comprising:
   a holding jig provided with a hollow portion into which the end part of the conductor is inserted; and
   a driving unit comprising a rotating shaft configured to move the holding jig in a circumferential direction and in an axial direction relative to the stator core; wherein:
   at least one projection configured to bite into the end part of the conductor is formed on an inner side wall at a starting distance from an opening edge of the hollow portion, the end part of the conductor coming into contact with the inner side wall, and the at least one projection projects toward an inside of the hollow portion so that the hollow portion is narrowed by the at least one projection, wherein the inner side wall extended from the opening edge of the hollow portion to an opposite end of the hollow portion.

2. The twisting and bending device according to claim 1, wherein:
   the inner side wall includes
      a first inner side wall located on a side of a rotating direction in which the twisting and bending device is rotated by the driving unit along the circumferential direction relative to the stator core and
      a second inner side wall opposing the first inner side wall; and
   the projection is formed on the first inner side wall.

3. The twisting and bending device according to claim 2, wherein a second projection configured to bite into the conductor is further formed on the second inner side wall.

4. The twisting and bending device according to claim 3, wherein the second projection is formed at a position corresponding to a bending starting position of the conductor on the second inner side wall of the hollow portion.

5. The twisting and bending device according to claim 2, wherein an inclined portion that widens toward an opening of the hollow portion is formed on the first inner side wall.

* * * * *